(12) United States Patent
Sakai et al.

(10) Patent No.: US 8,811,036 B2
(45) Date of Patent: Aug. 19, 2014

(54) ELECTRONIC DEVICE AND FRAME MEMBER

(75) Inventors: Takahiro Sakai, Minato-ku (JP); Seiichirou Gotou, Kakegawa (JP); Toshiki Yamanaka, Kakegawa (JP)

(73) Assignee: NEC Corporation, Tokyo (JP)

( * ) Notice: Subject to any disclaimer, the term of this patent is extended or adjusted under 35 U.S.C. 154(b) by 260 days.

(21) Appl. No.: 12/738,044

(22) PCT Filed: Oct. 16, 2008

(86) PCT No.: PCT/JP2008/068723
§ 371 (c)(1),
(2), (4) Date: Apr. 14, 2010

(87) PCT Pub. No.: WO2009/051165
PCT Pub. Date: Apr. 23, 2009

(65) Prior Publication Data
US 2010/0220458 A1    Sep. 2, 2010

(30) Foreign Application Priority Data
Oct. 17, 2007  (JP) ................................ 2007-270110

(51) Int. Cl.
*H05K 7/18*      (2006.01)
*A47B 81/00*     (2006.01)

(52) U.S. Cl.
USPC ............... 361/829; 361/679.26; 361/679.27; 312/223.1; 312/223.2; 312/223.3; 312/223.4; 312/223.5; 312/223.6

(58) Field of Classification Search
USPC .............................. 361/829; 312/223.1–223.6
See application file for complete search history.

(56) References Cited

U.S. PATENT DOCUMENTS

| | | |
|---|---|---|
| 2006/0119760 A1 | 6/2006 | Okuda |
| 2006/0146486 A1* | 7/2006 | Wikstrom et al. ............ 361/681 |
| 2007/0165152 A1* | 7/2007 | Suzuki et al. .................. 349/58 |
| 2008/0043413 A1 | 2/2008 | Okuda |

FOREIGN PATENT DOCUMENTS

| | | | |
|---|---|---|---|
| JP | 6-265853 A | 9/1994 | |
| JP | 07-281156 A | 10/1995 | |
| JP | 11-109319 A | 4/1999 | |
| JP | 11-126033 A | 5/1999 | |
| JP | 2000-193944 A | 7/2000 | |
| JP | 2003-195300 A | 7/2003 | |
| JP | 2004-172454 A | 6/2004 | |
| JP | 2004-251938 A | 9/2004 | |
| JP | 2005-189499 A | 7/2005 | |
| JP | 2006-154401 A | 6/2006 | |
| JP | 2006-209037 A | 8/2006 | |
| JP | 2006-243628 A | 9/2006 | |
| JP | 2008-026534 A | 2/2008 | |
| JP | 2008-083357 * | 4/2008 | ............... G09F 9/00 |
| JP | 2008-083357 A | 4/2008 | |

* cited by examiner

*Primary Examiner* — Jayprakash N Gandhi
*Assistant Examiner* — Mukund G Patel
(74) *Attorney, Agent, or Firm* — Sughrue Mion, PLLC

(57) ABSTRACT

A frame member (130) includes a bottom plate part (132) facing the lower surface of a display device (110), a wall part (133) extending upwardly from an edge part of the bottom plate part (132), and a top plate part (134) extending from an upper edge part of the wall part in a horizontal direction. An aperture (131) into which a wiring member (120) connected to the display device (110) is inserted is formed between the wall part (133) and the top plate part (134). The frame member (130) retains and supports the display device (110).

11 Claims, 7 Drawing Sheets

ELECTRONIC DEVICE AND FRAME MEMBER

TECHNICAL FIELD

The present invention relates to an electronic device having a tabular display device, and more particularly, an electronic device with a structure of supporting a display device with a box-like frame member, and a frame member thereof.

BACKGROUND ART

Electronic devices like cellular phone terminals are equipped with a display device. It becomes requisite for the electronic devices in a portable size to ensure both enlargement of the screen size of the display device and reduction in size of the whole device.

An example of the foregoing electronic devices will be explained. An exemplified electronic device 200 has, as shown in FIG. 5 and FIG. 7, a tabular display device 210.

The electronic device 200 further includes, as shown in FIG. 5, a wiring member 220 which is connected to the display device 210, a frame member 230 which supports the display device 210, a circuit substrate 240 which is connected to the display device 210 through the wiring member 220 and arranged below the frame member 230, a lower cover 250 which is attached to the lower surface of the frame member 230, and an upper cover 260 which is transparent and attached to the upper surface of the frame member 230. Furthermore, an aperture 231 into which the wiring member 220 is inserted is formed in the frame member 230.

The frame member 230 is formed by pressing a metal plate. The frame member 230 includes a bottom plate part 232 facing the lower surface of the display device 210, a front wall part 233 facing a front end part of the display device 210, and a top plate part 234 which is continuous from the upper edge of the front wall part 233 toward the front.

The aperture 231 is formed, as shown in FIG.5 and FIG. 7, in a boundary position between the bottom plate part 232 and the front wall part 233.

Currently, there are various proposals as the foregoing electronic device (see, for example, patent literatures 1 to 4).

Patent Literature 1: Unexamined Japanese Patent Application KOKAI Publication No. 2000-193944
Patent Literature 2: Unexamined Japanese Patent Application KOKAI Publication No. 2004-172454
Patent Literature 3: Unexamined Japanese Patent Application KOKAI Publication No. 2004-251938
Patent Literature 4: Unexamined Japanese Patent Application KOKAI Publication No. 2005-189499

DISCLOSURE OF INVENTION

Problem to Be Solved By the Invention

According to the foregoing electronic device 200, the frame member 230 protects the display device 210 by supporting the display device 210.

The display device 210 is likely to be broken down if stress acts from a direction perpendicular to the surface. Consequently, it is necessary that the frame member 230 surely supports the lower surface of the display device 210 by the bottom plate part 232.

According to the foregoing electronic device 200, however, the aperture 231 into which the wiring member 220 is inserted is formed in the boundary between the bottom plate part 232 and the front wall part 233.

Consequently, the bottom plate part 232 and the front wall part 233 are not coupled together at a position where the aperture 231 is formed. Therefore, the bottom plate part 232 is easily bent if, for example, stress acts on a front edge part in the vicinity of the aperture 231.

That is, it is difficult to surely support the lower surface of the display device 210 at a part of the bottom plate part 232 of the frame member 230 in the vicinity of the aperture 231. Consequently, according to the foregoing electronic device 200, the display device 210 is likely to be broken down when stress acts on the front part or the like of the display device 210 from the above.

The present invention has been made in view of the foregoing problem, and it is an object of the present invention to provide an electronic device which can suppress or prevent any destruction of a display device, and a frame member thereof.

Means For Solving the Problem

An electronic device according to the first aspect of the present invention comprises: a display device; a wiring member connected to the display device; and a frame member supporting the display device, and wherein the frame member includes: a bottom plate part facing a lower surface of the display device; a front wall part which is continuous upwardly from a front edge part of the bottom plate part, and faces a front end part of the display device; and a top plate part which is continuous from an upper edge part of the front wall part toward the front, and an aperture into which the wiring member is inserted is formed between the front wall part and the top plate part.

A frame member according to the second aspect of the present invention supports a display device, and comprises: a bottom plate part facing a lower surface of the display device; a wall part extending upwardly from an edge part of the bottom plate part; and a top plate part extending from an upper edge part of the wall part in a horizontal direction, and wherein an aperture into which a wiring member connected to the display device is inserted is formed between the wall part and the top plate part.

Note that various structural elements of the present invention do not need to be individually independent parts, and it is possible that, for example, a plurality of structural elements are formed as a single member, a single structural element is formed by a plurality of members, a structural element is a part of another structural element, a part of a structural element duplicates a part of other structural elements.

Moreover, in the present invention, although directions of top, bottom, front, and rear, and the like are defined, those are defined for convenience to simplify the explanation of the relativity of structural elements, and are not to limit a direction when in producing a device realizing the present invention, or when in use thereof.

Effect of the Invention

According to a frame member of an electronic device of the present invention, a box structure with an opened upper surface is formed that a bottom plate part, a front wall part, and a top plate part are successive in this order to support a display device. Note that an aperture into which a wiring member of the display device is inserted is formed in a boundary position between the front wall part and the top plate part. Accordingly, the front wall part is continuous across the whole area of the front edge part of the bottom plate part, thereby ensuring the strength of the bottom plate part which supports the lower surface of the display device. Consequently, even when stress acts on the display device from the above, it is possible to suppress or prevent any destruction of the display device by supporting the display device successfully with the frame member.

DESCRIPTION OF REFERENCE NUMERALS

Figure 1:
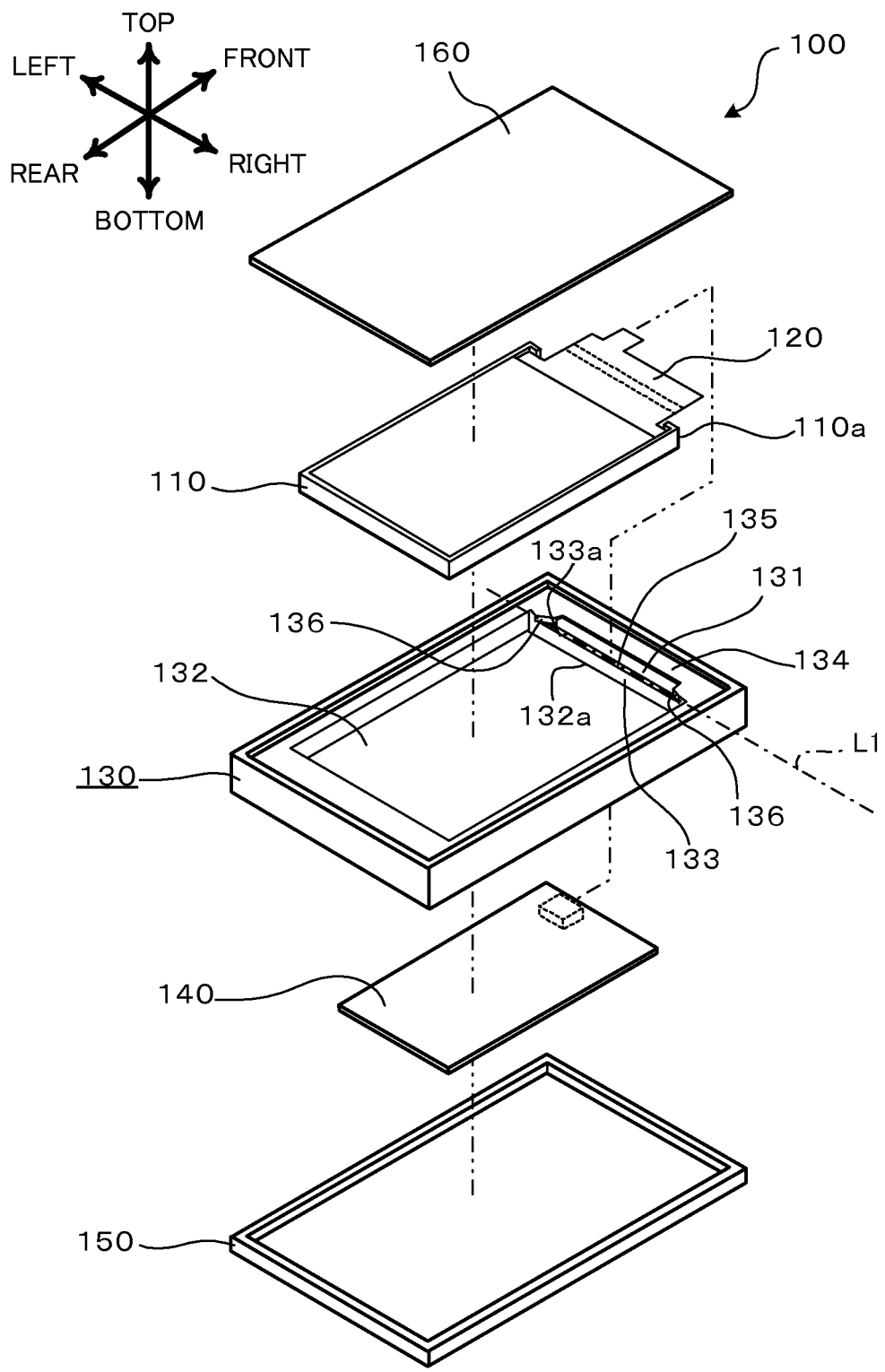
FIG. 1 is an exploded perspective view showing the assemble structure of an electronic device according to an embodiment of the present invention.

100 Electronic device
110 Display device
120 Wiring member
130 Frame member
131 Aperture
132 Bottom plate part
133 Front wall part
134 Top plate part
135, 135a Reinforcing plate member
136 Side plate part
140 Circuit substrate
150 Lower cover
160 Upper cover
200 Electronic device
210 Display device
220 Wiring member
230 Frame member
231 Aperture
232 Bottom plate part
233 Front wall part
234 Top plate part
240 Circuit substrate
250 Lower cover
260 Upper cover

BEST MODE FOR CARRYING OUT THE INVENTION

An explanation will be given of an embodiment of the present invention with reference to FIG. 1 to FIG. 3. Note that in the embodiment, an explanation will be given by defining directions of front, rear, left, right, top, and bottom as illustrated. This is, however, for convenience to simplify the explanation of the relativity of structural elements. Consequently, it is not to limit a direction when in producing a device realizing the present invention, or when in use thereof.

An electronic device 100 of the embodiment includes, as shown in FIG. 1, a display device 110, a wiring member 120, and a frame member 130.

The display device 110 is formed thin in a vertical direction and is formed in a tabular shape. The display device 110 includes a linear front end part 110a.

The wiring member 120 is formed thin in a vertical direction and is formed in a sheet-like shape, and connected to the front end part 110a of the display device 110.

The frame member 130 retains and supports the display device 110. The frame member 130 is made of a metal, e.g., a magnesium alloy or a stainless alloy, and formed in a box-like shape having an upper surface eliminated (an aperture is formed in the upper surface). Note that the upper surface faces the display surface of the display device 110. A slit-like aperture 131 which is flattened (narrowed) in a vertical direction and into which the wiring member 120 is inserted is formed in the frame member 130.

Figure 2:
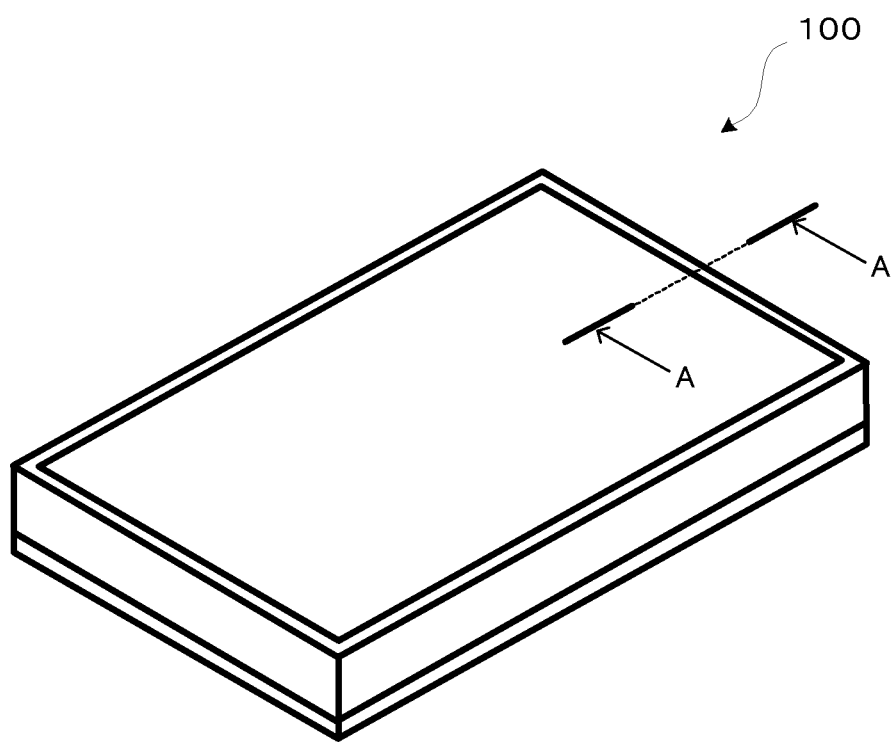
FIG. 2 is a perspective view showing the external appearance of the electronic device.

More specifically, the electronic device 100 of the embodiment is formed in a portable size which can be held by at least one hand, and as shown in FIG. 2, is configured with the display unit of an openable/closable cellular phone terminal (not illustrated).

According to such cellular phone terminal, a display unit and a keyboard unit both having a substantially equal contour are coupled together by a hinge structure in an openable/closable manner. Note that in order to facilitate understanding below, an explanation will be given of the display unit only of the foregoing cellular phone terminal as the electronic device 100.

The electronic device 100 includes, in addition to the foregoing display device 110, the wiring member 120, and the frame member 130, a circuit substrate 140 which is connected to the display device 110 via the wiring member 120 and arranged below the frame member 130, a lower cover 150 which surrounds the circuit substrate 140 and is attached to the lower surface of the frame member 130, and an upper cover 160 which is transparent and attached to the upper surface of the frame member 130 so as to function as the display unit of the cellular phone terminal.

The frame member 130 is formed by pressing a metal plate, e.g., a magnesium alloy or a stainless alloy. The frame member 130 includes a bottom plate part 132 facing the lower surface of the display device 110, a front wall part 133 facing the front end part 110a of the display device 110, and a top plate part 134. Moreover, the bottom plate part 132 includes a linear frond edge part 132a, and the front wall part 133 includes a linear upper edge part 133a. The front wall part 133 is upwardly continuous (extends) from the front edge part 132a of the bottom plate part 132 to the upper edge part 133a, and the top plate part 134 is continuous (continues) from the upper edge part 133a of the front wall part 133 toward the front.

Figure 3:
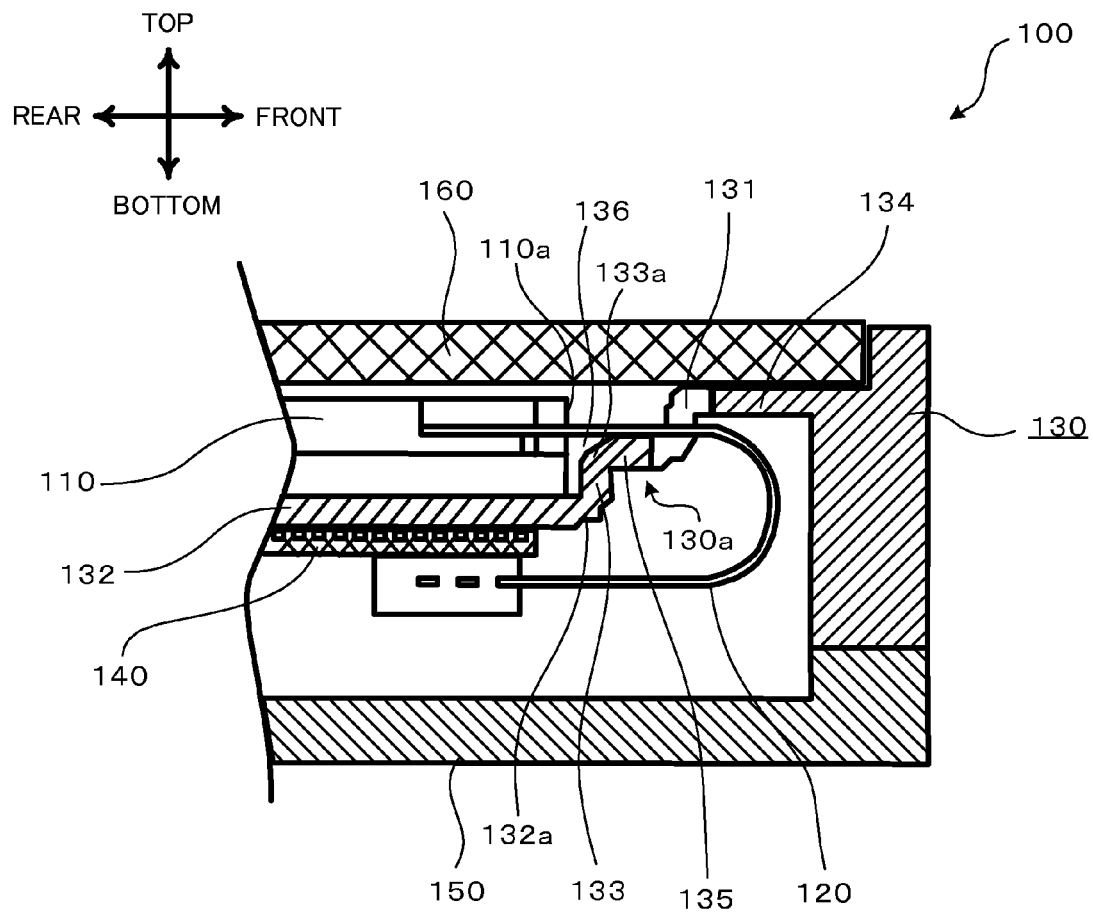
FIG. 3 is a cross-sectional view along a line A-A in FIG. 2.

The aperture 131 is formed in, as shown in FIG. 1 and FIG. 3, a position between the front wall part 133 and the top plate part 134 (boundary). The frame member 130 includes a reinforcing plate member 135 which is continuous from the upper edge part 133a of the front wall part 133 toward the front (to the lower edge part of the aperture 131) in a rib-like manner.

That is, the frame member 130 of the electronic device 100 of the embodiment includes a stepped part 130a which is continuous from the bottom plate part 132 to the top plate part 134. The stepped part 130a is formed in a two-step (multistep) manner. Moreover, the frame member 130 further includes a side plate part 136 which is continuous to the reinforcing plate member 135, the front wall part 133, and the top plate part 134 at both left and right sides of the aperture 131. The side plate part 136 is formed in a tabular shape and is in an inclined structure.

The front end part 110a of the display device 110, the front edge part 132a of the bottom plate part 132, and the upper edge part 133a of the front wall part 133 are arranged on a substantially same straight line L1 (see FIG. 1) in a horizontal direction. The slit-like aperture 131 is arranged slightly frontward of the straight line L1.

In the foregoing configuration, according to the frame member 130 of the electronic device 100 of the embodiment, a box-like structure with an opened upper surface is formed as the bottom plate part 132, the front wall part 133, and the top plate part 134 are continuous in this order to support the display device 110.

Note that the aperture 131 into which the wiring member 120 is inserted is formed in the boundary position between the front wall part 133 and the top plate part 134. Accordingly, the front wall part 133 is continuous across the whole area of the front edge part of the bottom plate part 132, thereby ensuring the strength of the bottom plate part 132 which supports the lower surface of the display device 110.

Consequently, even if stress acts on the display device 110 from the above, it is possible to suppress any destruction of the display device 110 by supporting the display device 110 successfully with the frame member 130.

In addition, the frame member 130 of the display device 100 of the embodiment includes the reinforcing plate member 135 which is continuous in a rib-like manner from the upper edge part 133a of the front wall part 133 toward the front (to the lower edge part of the aperture 131), and the side plate part 136 which is continuous (connected) to the reinforcing plate member 135, the front wall part 133, and the top plate part 134 at both left and right sides of the aperture 131.

Accordingly, the strength of the front wall part 133 in which the aperture 131 is formed is adequately ensured by the reinforcing plate member 135 and the side plate part 136. Consequently, it is possible to further suppress any destruction of the display device 110 by supporting the display device 110 successfully with the frame member 130.

Note that the electronic device 100 of the embodiment has the frame member 130 formed of a metal plate. Accordingly, the plate thickness is basically uniform, so that it is difficult to form an essential part thick in order to ensure the strength.

Moreover, the electronic device 100 of the embodiment is formed in a portable size which can be held by at least one hand. Accordingly, it is difficult to immoderately increase the size of the frame member 130 to ensure the strength.

According to the electronic device 100 of the embodiment, however, the strength necessary to support the display device 110 is ensured by devising the shape of the frame member 130 as explained above.

Note that the present invention is not limited to the foregoing embodiment, and can be changed and modified in various forms without departing from the scope of the present invention. For example, in the foregoing embodiment, the explanation has been given of an example case in which the electronic device 100 is the display unit of the openable/closable cellular phone terminal.

However, the electronic device 100 may be the display unit of a slide-type cellular phone terminal which is not openable/closable, of a solid-type cellular phone terminal which is not openable/closable, and of a PDA (Personal Digital Assistance), an electronic dictionary or the like which is openable/closable, a slide-type, or a solid-type (not illustrated). As explained above, when the electronic device is a solid-type, the display device thereof may be a touch panel which also functions as a keyboard device (not illustrated).

Figure 4:
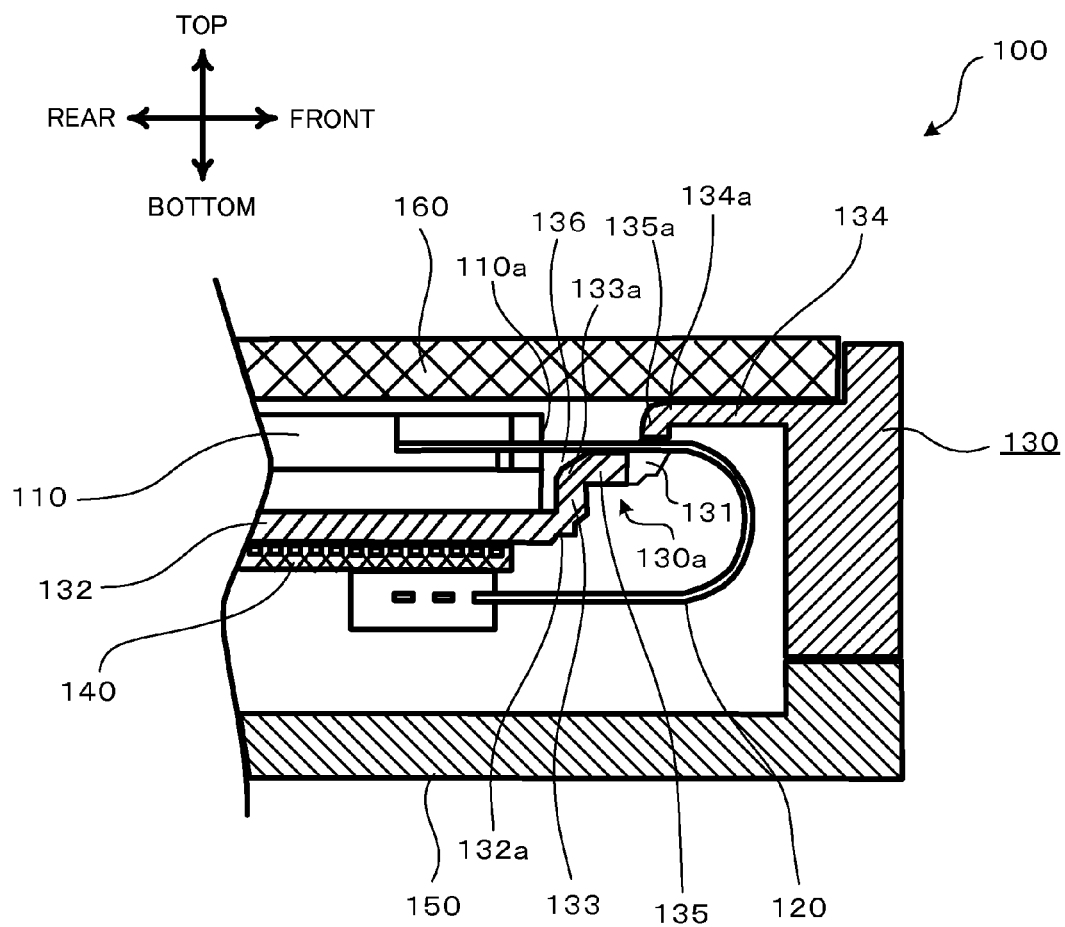
FIG. 4 is a cross-sectional view showing a modified example of a reinforcing plate member.
Figure 5:
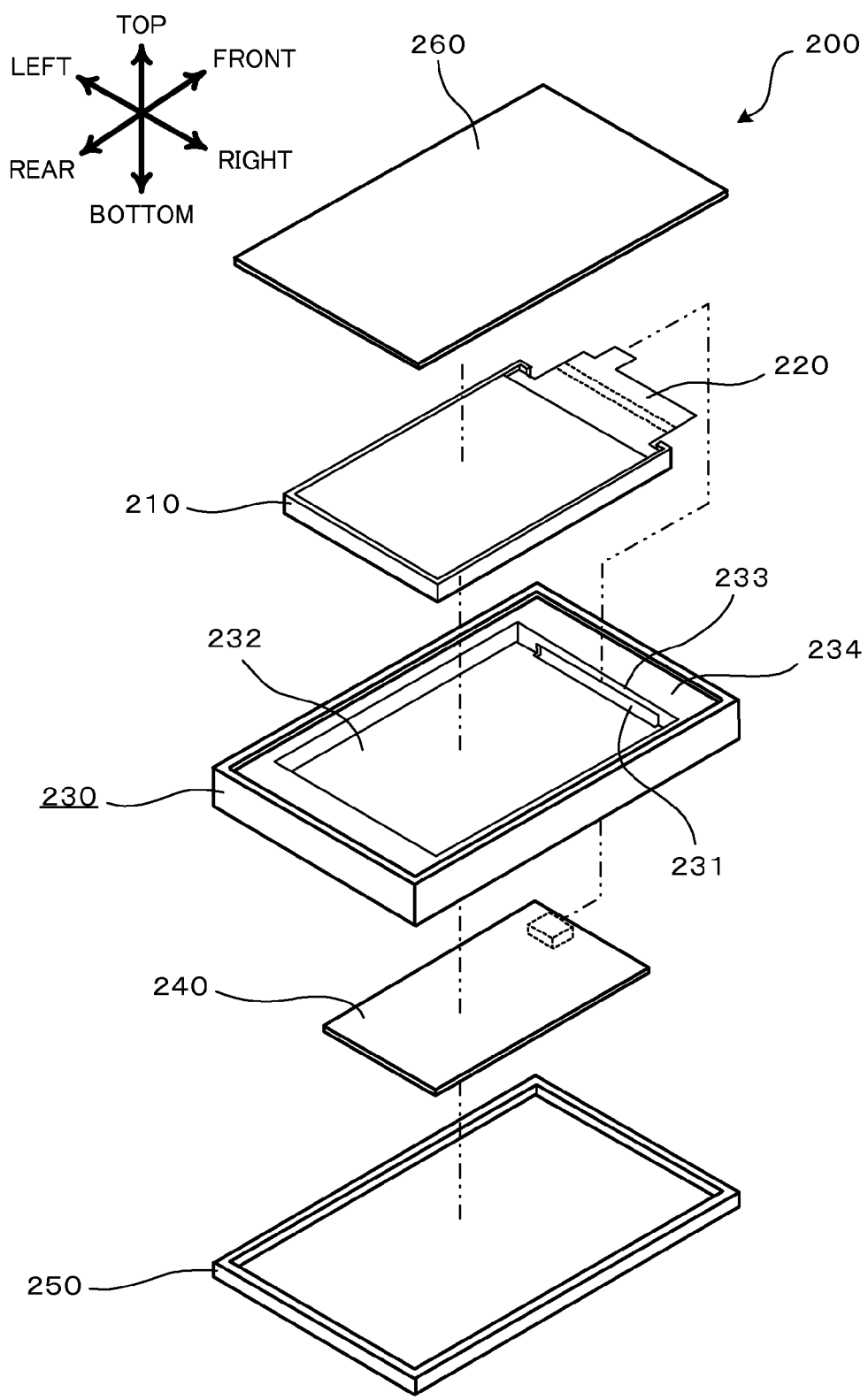
FIG. 5 is an exploded perspective view showing the assemble structure of an example conventional electronic device.
Figure 6:
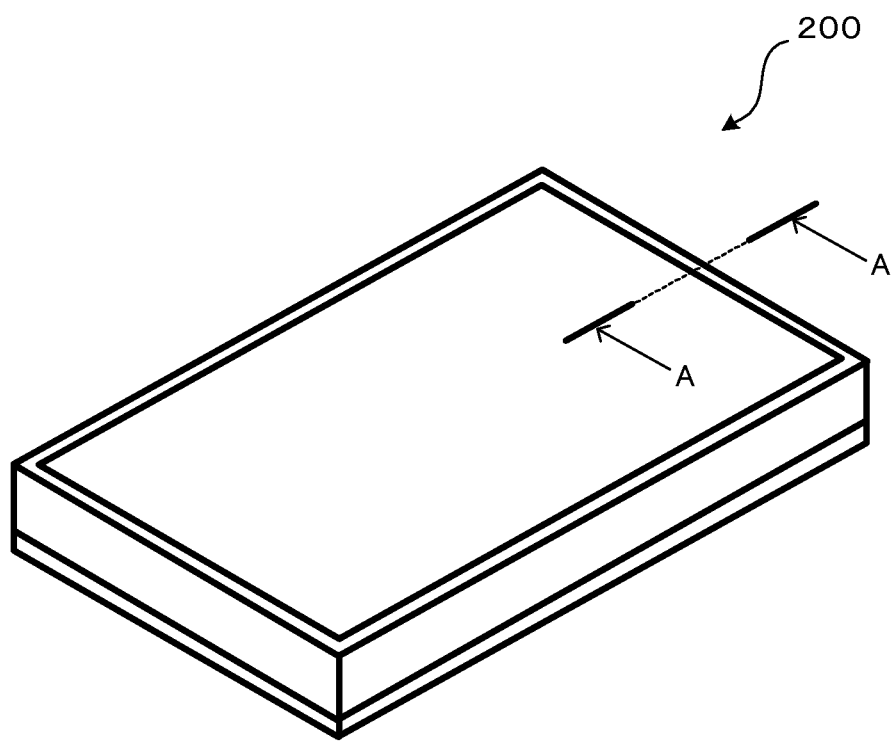
FIG. 6 is a perspective view showing the external appearance of the electronic device.
Figure 7:
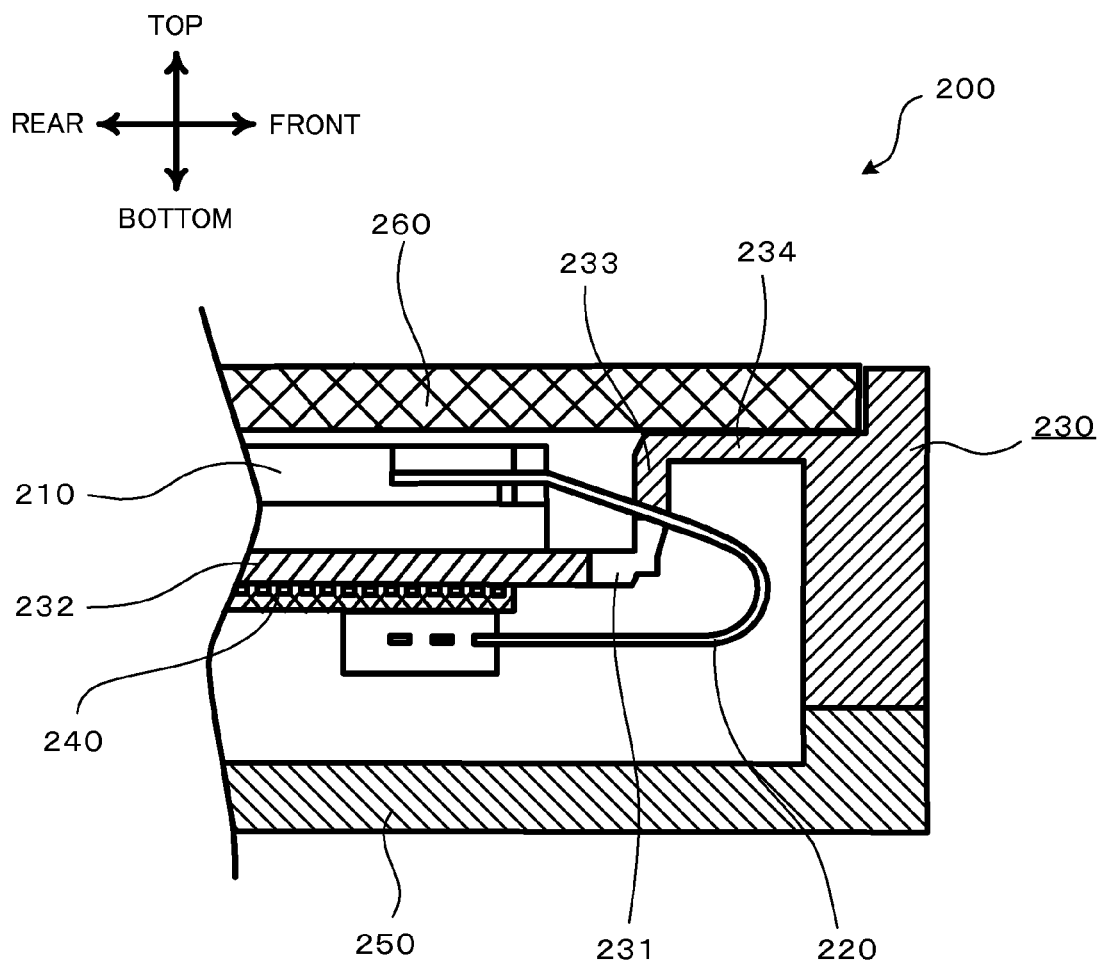
FIG. 7 is a cross-sectional view along a line A-A in FIG. 6.

In the foregoing embodiment, the explanation has been given of an example case in which the electronic device has the reinforcing plate member 135 which is continuous from the upper edge part 133a of the front wall part 133 of the frame member 130 toward the front (to the lower edge part of the aperture 131) in a rib-like manner. However, as shown in FIG. 4, the electronic device may have a reinforcing plate member 135a which is continuous downwardly from a rear end part 134a of the top plate part 134 (to the front edge part of the aperture 131) in a rib-like manner, instead of or together with the reinforcing plate member 135.

The foregoing embodiment and a plurality of modified embodiments can be combined together as far as those contents do not contradict one another. Moreover, in the foregoing embodiment and the modified embodiments, although the structure of each part and the like have been explained in detail, the structure and the like can be changed and modified in various forms as far as the scope of the present invention is fulfilled.

This application is based on Japanese Patent Application No. 2007-270110 filed on Oct. 17, 2007. The specification, claims, and drawings of Japanese Patent Application No. 2007-270110 are entirely incorporated herein by reference in this specification.

INDUSTRIAL APPLICABILITY

The present invention is applicable to an electronic device having a display device, a frame member thereof and the like.

The invention claimed is:

1. An electronic device comprising:
a display device;
a wiring member connected to the display device; and
a frame member supporting the display device, and wherein the frame member includes:
   a bottom plate part facing a lower surface of the display device;
   a front wall part which is continuous upwardly from a front edge part of the bottom plate part, and faces a front end part of the display device;
   a top plate part which is located above an upper edge part of the front wall part, and includes a portion that is continuous to a first portion of the upper edge part of the front wall part; and
   a reinforcing plate member which is continuous frontwardly from a second portion of the upper edge part of the front wall part, the second portion being positioned lower than the first portion and parallel to the front edge part of the bottom plate part, and
an aperture into which the wiring member is inserted is formed by a front end part of the reinforcing plate member and a portion of the top plate part that faces the front end part of the reinforcing plate member.

2. The electronic device according to the claim 1, wherein the display device has a tabular contour,
the front end part of the display, device is formed linearly,
the wiring member has a flat contour in a vertical direction, and is connected to the front end part of the display device,
the aperture has a slit-like contour,
the front edge part of the bottom plate part is formed linearly, and
the upper edge part of the front wall part is formed linearly.

3. The electronic device according to the claim 1, wherein the reinforcing plate member is continuous from the second portion of the upper edge part of the front wall part toward the front in a rib-like manner.

4. The electronic device according to claim 1, wherein the frame member includes another reinforcing plate member which is continuous downwardly from a rear end part of the top plate part in a rib-like manner.

5. The electronic device according to claim 4, wherein the frame member includes a side plate part which connects the other reinforcing plate member, the front wall part, and the top plate part to one another at both left and right sides of the aperture.

6. The electronic device according to claim 1, wherein the frame member is formed of a metal.

7. The electronic device according to claim 1, which is formed in a portable size that can be held by at least one hand.

8. A frame member supporting a display device, comprising:
- a bottom plate part facing a lower surface of the display device;
- a wall part extending upwardly from an edge part of the bottom plate part;
- a top plate part that is located above an upper edge part of he wall part. and includes a portion that is continuous to a first portion of the upper edge part of the wall part; and
- a reinforcing plate member which is continuous frontwardly from a second portion of the upper edge part of the wall part, the second portion being positioned lower than the first portion and parallel to the edge part of the bottom plate part, and
- an aperture into which a wiring member connected to the display device is inserted is formed by a front end part of the reinforcing plate member and a portion of the top plate part that faces the front end part of the reinforcing plate member.

9. The frame member according to claim 8, wherein the reinforcing plate member extends from the second portion of the upper edge part of the wall part toward the front in a rib-like manner.

10. The frame member according to claim 8, wherein the reinforcing plate member extends downwardly from a rear end part of the top plate part in a rib-like manner.

11. The electronic device according to claim 1, wherein the frame member comprises a side plate part that connects the reinforcing plate member, the front wall part and the top plate part to one another at both left and right sides of the aperture.

* * * * *